United States Patent [19]

Kitadate

[11] Patent Number: 5,408,660
[45] Date of Patent: Apr. 18, 1995

[54] SYSTEM FOR ANALYZING AND DISPLAYING DATA IN COMPUTER PROGRAM

[75] Inventor: Yohtaro Kitadate, Kawasaki, Japan

[73] Assignee: Fujitsu Limited, Kawasaki, Japan

[21] Appl. No.: 854,563

[22] Filed: Mar. 20, 1992

[30] Foreign Application Priority Data

Mar. 20, 1991 [JP] Japan ............................ 3-056711

[51] Int. Cl.$^6$ .............................................. G06F 11/32
[52] U.S. Cl. ............................ 395/650; 364/DIG. 1;
364/267.91; 364/285
[58] Field of Search ............... 371/19; 395/700, 650;
364/DIG. 1

[56] References Cited

U.S. PATENT DOCUMENTS

| | | | |
|---|---|---|---|
| 4,730,315 | 3/1988 | Saito et al. | 371/19 |
| 4,872,167 | 10/1989 | Maezawa et al. | 371/19 |
| 5,038,348 | 8/1991 | Yoda | 371/19 |
| 5,146,594 | 9/1992 | Iitsuka | 395/700 |
| 5,191,646 | 3/1993 | Naito et al. | 364/DIG. 1 |
| 5,255,385 | 10/1993 | Kikuchi | 371/19 |
| 5,293,631 | 3/1994 | Rau et al. | 395/700 |

*Primary Examiner*—Thomas M. Heckler
*Attorney, Agent, or Firm*—Staas & Halsey

[57] ABSTRACT

A system for analyzing and displaying program data capable of generating effective information for assuming paths of program execution on the basis of memory dump information of a program during stalling of the program. A data part accessing part access the data part of a program in the interruption state of running the program or at termination of the program. A linguistic-analysis-part for inputting a source program, and performs analysis for the source program according to grammar of the description language of the source program. A correspondence information accessing part accesses correspondence information of variables and addresses representing a correspondence of a variable name and a variable address in a load module. An evaluation part obtains the variable addresses for variables contained in respective assignment-expressions and comparison-expressions in the source program collected by the linguistic-analysis-part, derives a value of the data part variable in the program by the data part accessing part, and evaluates respective left-hand parts and right hand parts of the expression. A judging part determines that the expression is consistent when the left-hand part and the right-hand part are equal to each other for the assignment-expression, and when the values of the left-hand part and the right-hand part satisfy a comparison condition. A source-program-editing-part outputs the edited source program. The part judged consistent by the judging part is edited in distinguished form from other parts of the source program.

7 Claims, 19 Drawing Sheets

Fig. 5

JUDGING PART B6

COMPARING VALUES OF RIGHT-HAND PART AND LEFT-HAND PART AND MAKING JUDGEMENT WHETHER BOTH PARTS ARE EQUAL TO EACH OTHER IN CASE OF ASSIGNMENT-EXPRESSIONS AND WHETHER IT IS CONSISTENT WITH COMPARISON CONDITION IN CASE OF COMPARISON-EXPRESSION

ADDITIVE INFORMATION GENERATING PART B7

GENERATING ADDITIVE INFORMATION ON MAIN MEMORY TO INDICATE CONSISTENT PART OF ASSIGNMENT-EXPRESSIONS AND COMPARISON-EXPRESSIONS IN SOURCE PROGRAM

SOURCE-PROGRAM-EDITING-PART B8

PERFORMING EDITING CONSISTENT PARTS OF ASSIGNMENT-EXPRESSIONS AND COMPARISON-EXPRESSION INTO DISTINCT FROM REFERENCING TO ADDITIVE INFORMATION AND OUTPUTTING OVERALL SOURCE PROGRAM

VARIABLE-ADDRESS CORRESPONDENCE INFORMATION ACCESSING PART B9

READING VARIABLE-ADDRESS CORRESPONDENCE INFORMATION OF PROGRAM A INTO MAIN MEMORY AND DERIVE ADDRESS IN DATA PART AND LENGTH CORRESPONDING TO GIVEN NAME OF THE VARIABLE

Fig. 8

```
if(line>66)                    /* IF NEXT PRINTING LINE POSITION */
                               /* (line) IS GREATER THAN 66 */
{
    if(heads==0)               /* IF OLD HEADER TYPE WAS 0 */
    {
        heads=1;               /* SET NEW HEADER TYPE TO 1 */
        line=printhead1();     /* PRINT HEADER 1 AND GET NEXT */
                               /* PRINTING LINE POSITION (line) */
    }
    else                       /* IF OLD HEADER TYPE WAS NOT 0 */
    {
        heads=0;               /* SET NEW HEADER TYPE TO 0 */
        line=printhead0();     /* PRINT HEADER 0 AND GET NEXT */
                               /* PRINTING LINE POSITION (line) */
    }
}
printline(p);                  /* OUTPUT INFORMATION FOR ONE */
                               /* LINE DATA POINTED BY p */
line=line+1;                   /* INCREMENT NEXT PRINTING */
                               /* POSITION(line) */
```

Fig. 9

| [CASE 1] | [CASE 2] |
|----------|----------|
| line=67  | line=20  |
| heads=1  | heads=1  |

Fig. 10

[CASE 1]

```
if(line>66)
   {
   if(heads==0)
      {
      heads=1;
      line=printhead1();
      }
   else
      {
      heads=0;
      line=printhead0();
      }
   }
printline(p);
line=line+1;
```

[CASE 2]

```
if(line>66)
   {
   if(heads==0)
      {
      heads=1;
      line=printhead1();
      }
   else
      {
      heads=0;
      line=printhead0();
      }
   }
printline(p);
line=line+1;
```

(INDICATE CONSISTENT EXPRESSION WITH UNDERLINE)

Fig. 11

| NAME OF VARIABLE | TYPE | SIZE (BYTE) | RELATIVE ADDRESS IN DATA PART | | |
|---|---|---|---|---|---|
| line | INTEGER | 4 | adr-1 | | |
| heads | INTEGER | 4 | adr-2 | | |
| | | | | | |
| | | | | | |

| INHERITED TOKEN ID | |
|---|---|
| START POSITION OF INPUT TOKEN-SEQUENCE | : INDICATE POSITION OF TOKEN IN INPUT TOKEN-SEQUENCE |
| LENGTH OF INPUT TOKEN-SEQUENCE | |
| EVALUATION RESULT STORING ADDRESS | |
| APPLIED GRAMMATICAL RULE | |
| COUNT OF CHILD NODES | |

| | |
|---|---|
| CHILD NODE 1 | CHILD NODE ADDRESS |
| | EVALUATION RESULT AREA |
| CHILD NODE 2 | CHILD NODE ADDRESS |
| | EVALUATION RESULT AREA |
| . . . . | |

| Fig. 15A |
| Fig. 15B |

{
RULE APPLIED FOR line<66 (rule no-1)
relational-expression : relational-expression < shift-expression RULE APPLIED FOR line (rule no-2)
relational-expression : identifier RULE APPLIED FOR shift-expression (rule no-3)
shift-expression : constant
}

Fig. 20

| START LINE NUMBER | START DIGIT POSITION | END LINE NUMBER | END DIGIT POSITION |
|---|---|---|---|
| 110 | 4 | 110 | 10 |
| 114 | 9 | 114 | 15 |

```
      4           10
110: if (line>66)

9      15
114: heads = 1 ;
```

SYSTEM FOR ANALYZING AND DISPLAYING DATA IN COMPUTER PROGRAM

BACKGROUND OF THE INVENTION

1. Field of the Invention

The present invention relates to a system for analyzing and displaying data in a computer program written in a high-level language, such as FORTRAN, C-language or so forth, which are useful for debugging.

2. Description of the Related Art

In general, it is often experienced during the making of a new program, that the execution of the program is abnormally terminated in the interrupted state of running when it is executed after being compiled from a source program by a compiler.

In such a case, an effective way for finding the cause of error in a program is to know the path in the program to reach the interruption and to check the portion of that path in the program.

To do the above an operator can try to execute a program obtain the trace information that is a sequential output, for example, of the line numbers executed in the program. It is easy to find the path as to the failure in the program.

However, the trace information is normally collected only when abnormal termination of the program is expected. In other words, when the program is expected to run normally, trace information is unavailable. Even if the program is re-executed to obtain trace information after abnormal termination, it is uncertain that the same failure will occur.

Furthermore, even if the abnormal termination occurs again, execution of the program collecting the trace information can take a long time. Furthermore, when the user of the program does not have access to the author of the program, it may be impossible to obtain the trace information.

On the other hand, it is usual practice that the user's memory area in the main memory is saved when the program is terminated abnormally, partly because it does not cause much degradation of the performance of the entire system. Such information is known as memory dump information.

The programmer makes reference to the memory dump information to perform an investigation of the relationships of variable values, and thus assumes the program's run path and discriminates the portion of the path normally executed and the portion causing error.

For example, when a variable value that determines the result of a branch operation is found, destination of the branch can be assumed based on this variable value. On the other hand, by comparing the expected result of execution for the portion of the program and the content of memory dump, the operator can assure that the portion of the program is normally executed if they are equal to each other, and the operator can assume that the portion may be related to the error if the values do not coincide.

In the above-mentioned program debugging operation, the investigation is repeatedly performed manually by checking each individual variable. However, because of manual operation, it takes a long time to find the cause of the abnormal termination and it requires a substantial work load.

SUMMARY OF THE INVENTION

In view of the problems in the prior art as set forth above, it is an object of the present invention to provide a system for analyzing and displaying program data that can generate effective information for assuming paths of program execution on the basis of memory dump information or contents of a data area of the program in main memory.

In order to accomplish the above-mentioned and other objects, a system for analyzing and displaying program data comprises:

a data part accessing part for accessing content of the data part of a program in the interruption state of running or at the termination of the program;

a linguistic-analysis-part for inputting the source program of the program, analyzing the source program according to the grammar of the description language of the source program, and collecting assignment-expressions and comparison-expressions in the source program, further, collecting names of variables in the expressions above;

a correspondence information accessing part for accessing a variable address corresponding information that shows correspondence of the name of a variable and variable address in the load module of the program;

an evaluation part that obtains the variable addresses for variables contained in assignment-expressions and comparison-expressions in the source program collected by the linguistic-analysis-part, gets a value of the variables from the data part in the program in a memory dump using the data part accessing part, and evaluates respective left-hand parts and right hand parts of the expression;

a judging part that determines that the expression is consistent when the left-hand part and the right-hand part are equal to each other in the case of the assignment-expression and when the values of the left-hand part and the right-hand part satisfy a comparison condition in the case of the comparison-expression; and a source-program-editing-part which outputs the edited source program where the part of the consistent expressions is distinguished from other parts of the program on account of judgement by the judging part.

The linguistic-analysis-part may input the source program, generates parse-tree adapting a production rule of the language and generates an expression-evaluation-list that is a collection of pointers to nodes of the tree corresponding to the assignment-expressions and the comparison-expressions, and the evaluation part may perform evaluation for a sub-tree following the node of the expression-evaluation-list.

Preferably, the contents of data part in the interrupted state of the running of the program or at the termination of the program, to be used for evaluation, may be taken from a memory area on a main memory to which the program is loaded from an external storage unit and executed therein, or as an alternative, can be the contents output from the main memory output to the external storage unit, for example, as memory dump information.

It is also possible that the source-program-editing-part outputs the edited source program to a file area in the external storage unit, and subsequently outputs on a display screen a range of lines designated by the user of a keyboard-display terminal. The source-program-editing-part may also output the lines determined from the line number designated by the user and the overall information of line numbers that includes the consistent expressions.

BRIEF DESCRIPTION OF THE DRAWINGS

The present invention will become more fully understood from the detailed description given herebelow and from the accompanying drawings of the preferred embodiment of the invention, which, however, should not be taken to be limitative, but are for explanation and understanding only.

In the drawings:

FIGS. 4 and 5 are explanatory illustrations showing components of program B of the present invention;

FIG. 8 is a part of a program list on a program A written in C-language;

FIG. 9 is an explanatory illustration of values in a memory in the interrupted state of running of the program A of FIG. 8;

FIG. 10 is an explanatory illustration showing an example of an output of source programs corresponding to the interrupted state of FIG. 9;

FIG. 11 is an explanatory illustration showing variables—addresses corresponding information employed in the present invention;

FIG. 20 is an explanatory table for additive information.

DESCRIPTION OF THE PREFERRED EMBODIMENT

Figure 1:
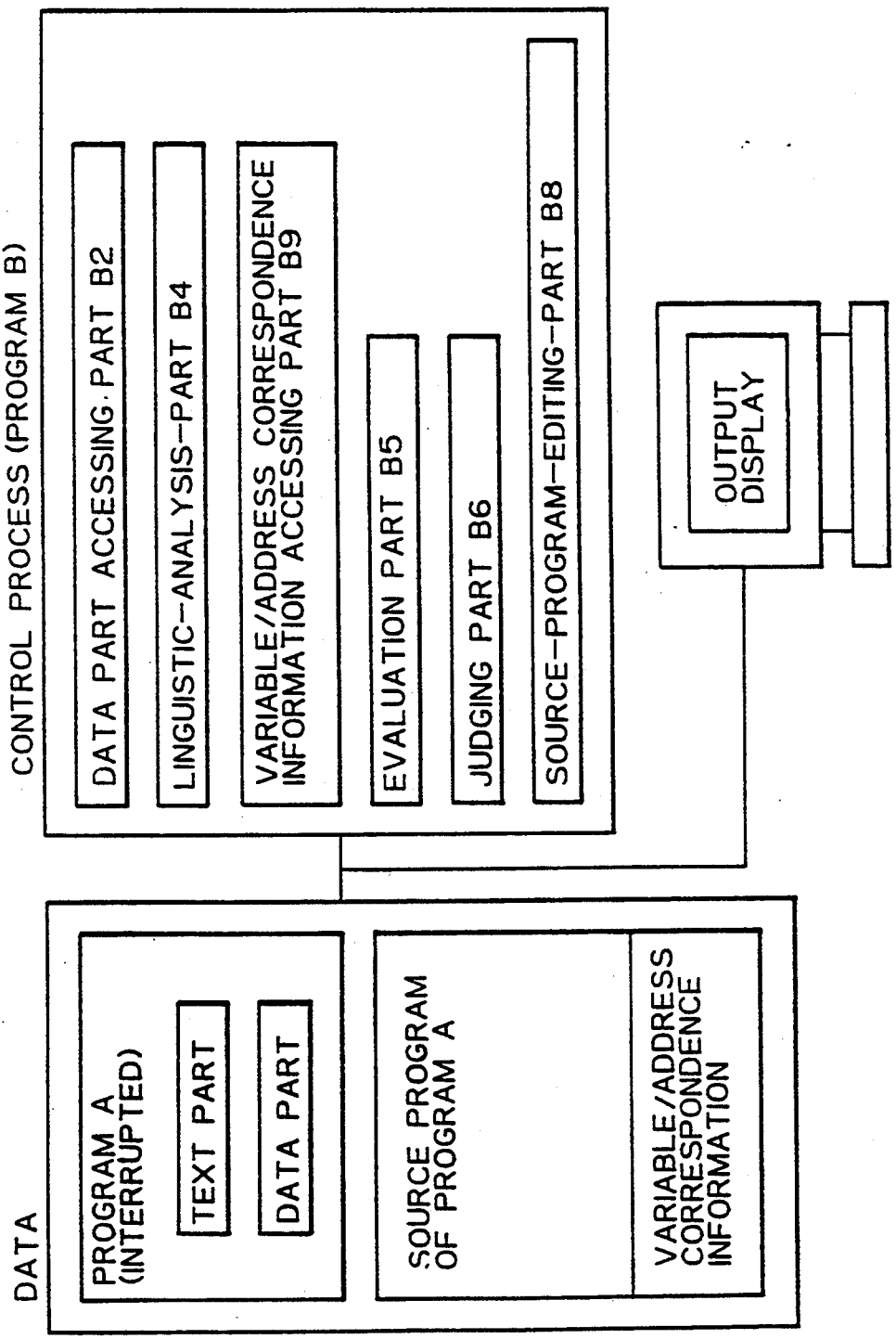
FIG. 1 is a schematic block diagram showing the basic construction of a system for analyzing and displaying program data according to the present invention.

Referring now to the drawings, particularly to FIG. 1, the principle of a system and process for analyzing and displaying program data, according to the present invention will be generally discussed herebelow.

The system of analyzing and displaying data of the program of the present invention includes a data part accessing part for accessing contents of the data part of a program A in the interrupted state of running or at the termination of the program. The system also includes a linguistic-analysis-part B4 for inputting the source program of the program A, analyzing the source program according to the grammar of the description language of the source program, and collecting assignment-expressions and comparison-expressions in the source program, further, collecting names of the variables in the above expressions; a correspondence information accessing part B9 for accessing of variable-address correspondence information representing the correspondence of the name of the variable and a variable address in the load module; and an evaluation part B5 that obtains the variable addresses for variables contained in respective assignment-expressions and comparison-expressions in the source program collected by the linguistic-analysis-part B4, derives the values of the variables from the data part in the program A by the data part accessing part B2, and evaluates respective left-hand parts and the right hand parts of the expression. The system further includes a Judging part B6 that determines that the expression is consistent when the left-hand part and the right-hand part are equal to each other in the case of the assignment-expression and consistent when the values of the left-hand part and the right-hand part satisfy a comparison condition in the case of comparison expression, and a source-program-editing-part B8 that outputs the edited source program where the part of the consistent expression judged as consistent by the judging part B6 is distinguished from other parts of the source program.

Here, the linguistic-analysis-part B4 inputs the source program, generates parse-tree adapting a production rule of the language and generates an expression-evaluation-list that is a collection of pointers to nodes of the tree corresponding to the assignment-expression and the comparison-expression.

Corresponding thereto, the evaluation part B5 performs an evaluation for a sub-tree of the node pointed from the expression-evaluation-list.

The contents of data part in the interrupted state of running of the program A or at the termination of the program A, to be used for evaluation, are taken from a memory area on a main memory to which the program A is loaded from an external storage unit and executed therein.

On the other hand, the contents of a data part in the interrupted state of running of the program A or at the termination of the program A can be the contents of output, such as memory dump information, which is the contents of the executed main memory output to the external storage unit.

Furthermore, the source-program-editing-part B8 outputs the edited source program to a file area of the external storage unit after the evaluation of the assignment-expression and the comparison-expression, and subsequently outputs a range of lines designated by the user of a keyboard-display terminal on a display screen.

Furthermore, the source-program-editing-part B8 may also output the lines determined from the line number designated by the user and the overall information of line numbers including the consistent expressions.

With the construction set forth above, the system of analyzing and displaying data of the program, according to the present invention, produces the following effect.

In general, the load module of the program is composed of a text part and the data part, and the program is executed by sequential execution of instructions in the text part by CPU.

During execution of the program, respective variables are repeatedly read out from the data part of the program and the result of the operation in the CPU is stored in the data part. This is normally written as the assignment-expression in the source program.

Two variables are also compared, for example, to determine the instruction to be executed next. It is determined depending upon the consistency and inconsistency of the condition. This is often written as a branch operation including the comparison-expression in the source program.

When the program is abnormally terminated, particularly in the last completely executed assignment-expression, the right-hand part re-calculated utilizing respective variables remaining in the memory or in the memory dump, is often consistent with the value of the variable of the left-hand part on the memory.

Equally, when the variables compared for determining the destination of branch operation are compared again, the actually selected jump destination is often selected again if it was the recently executed branch operation.

The present invention implements the foregoing idea. When abnormal termination of the program occurs, all of the assignment-expressions and the comparison-expressions are picked up from the source program, the picked-up assignment-expressions and the comparison-expressions are evaluated using the values of the data part of the program retained in the main memory or so forth to determine consistency and to output with marking, such an underline for the part of the expressions judged as consistent, and for distinguishing from other parts of the program.

Through the process set forth above, by automatically analyzing and displaying whether the assignment-expressions and the comparison-expressions are consistent or inconsistent on the source program, it becomes possible to provide very useful information in assuming the run path of the program.

The present invention will be discussed in more detail in terms of an exemplary embodiment of the system of analyzing and displaying data of the program according to the present invention.

Figure 2A:
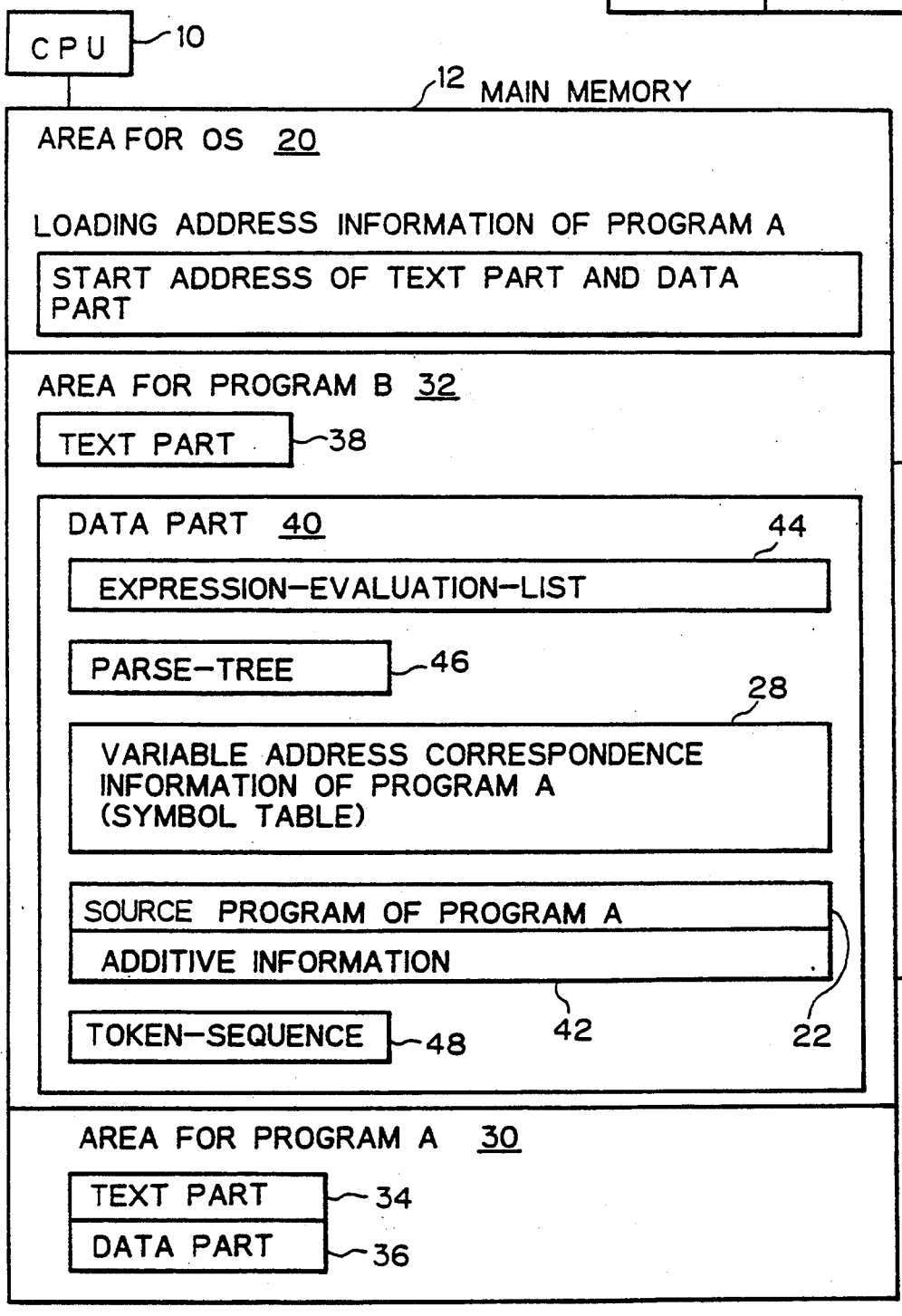
FIGS. 2A and 2B, connected as shown in FIG. 2, are a discrete diagram showing the overall construction of the system for analyzing and displaying program data according to the present invention.
Figure 2B:
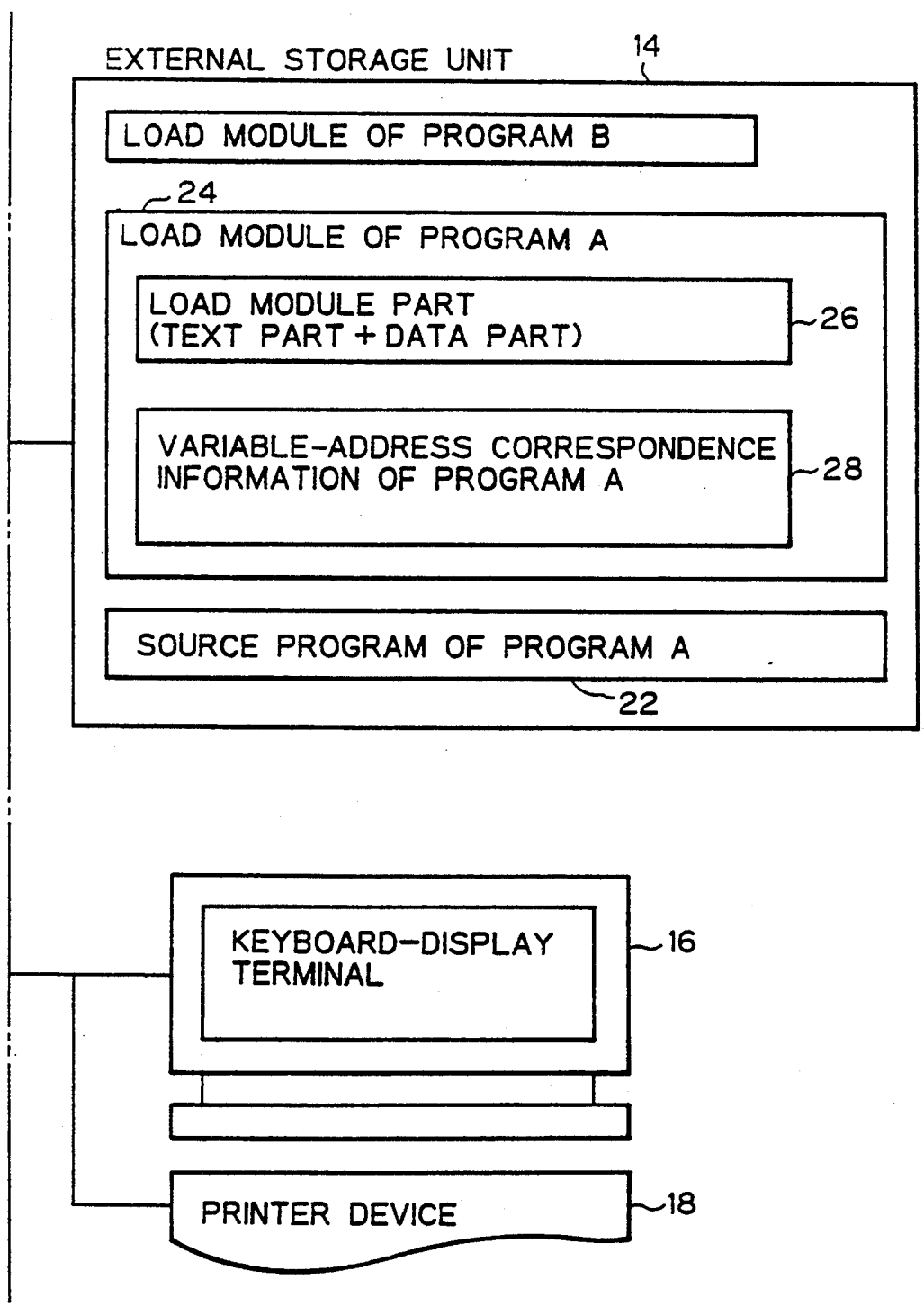

FIGS. 2A and 2B, connected as shown in FIG. 2, show the overall construction of the preferred embodiment according to the present invention. In FIGS. 2A and 2B, the reference numeral 10 denotes CPU, 12 denotes main memory, 14 denotes an external storage unit, 16 denotes a keyboard-display terminal, and 18 denotes a printer.

Depending upon an operating system (OS) in the OS area in the main memory 12 and a command entered by the user, CPU 10 reserves areas 30 and 32 for programs A and B, and then loads the program B from the external storage unit 14.

The external storage unit 14 stores a source program 22 of the program A to be debugged and a load module 24. The load module 24 of the program A includes a load module part 26 and a variable-address correspondence information 28. The variable-address correspondence information 28 is normally generated by a compiler when specifically designated by the user.

The OS reserves the area 30 for the program A in response to a request from the program B, performs a loading of the program A and then starts execution thereof.

When the OS loads the program A, the OS determines the positions of the text part 34 and the data part 36 on the main memory 12, and the start addresses and sizes of the text part 34 and the data part 36 are stored in the OS area 20.

The OS also has a function of interrupting an execution of the program A during execution of the program A or during program A's stand-by state for completion data entry, as a response to the request from the program B.

Furthermore, the OS has a function of notifying an occurrence of abnormal event in execution of the program A to the program B according to the preliminary request from the program B. When the abnormality occurs, such as trying to branch out of the range of the program A or trying to access data beyond the range of program A, it is notified to program B.

The OS further has a function of notifying the start address of the data part 36 and the text part 34 of the program A in response to the request from the program B.

In addition, the OS has functions to output the contents of the memory area for the program A to the external storage unit 14 upon the occurrence of requested interruption of execution or abnormal termination of the program A, and to read out the content of designated addresses in the main memory for the program A upon request from the program B.

In the data part 40 of the program B, the source program 22 of the program A and the variable/address correspondence information 28 of the program A from the external storage unit 14 are stored. For the source program 22 of the program A, an area for additive information is added.

Furthermore, respective areas for the expression evaluation-line 44, the parse-tree 46 and the token-sequence 48 are reserved.

The printer device 18 and the keyboard-display terminal 16 output the source program 22 of the program A processed by the program B.

Figure 3:
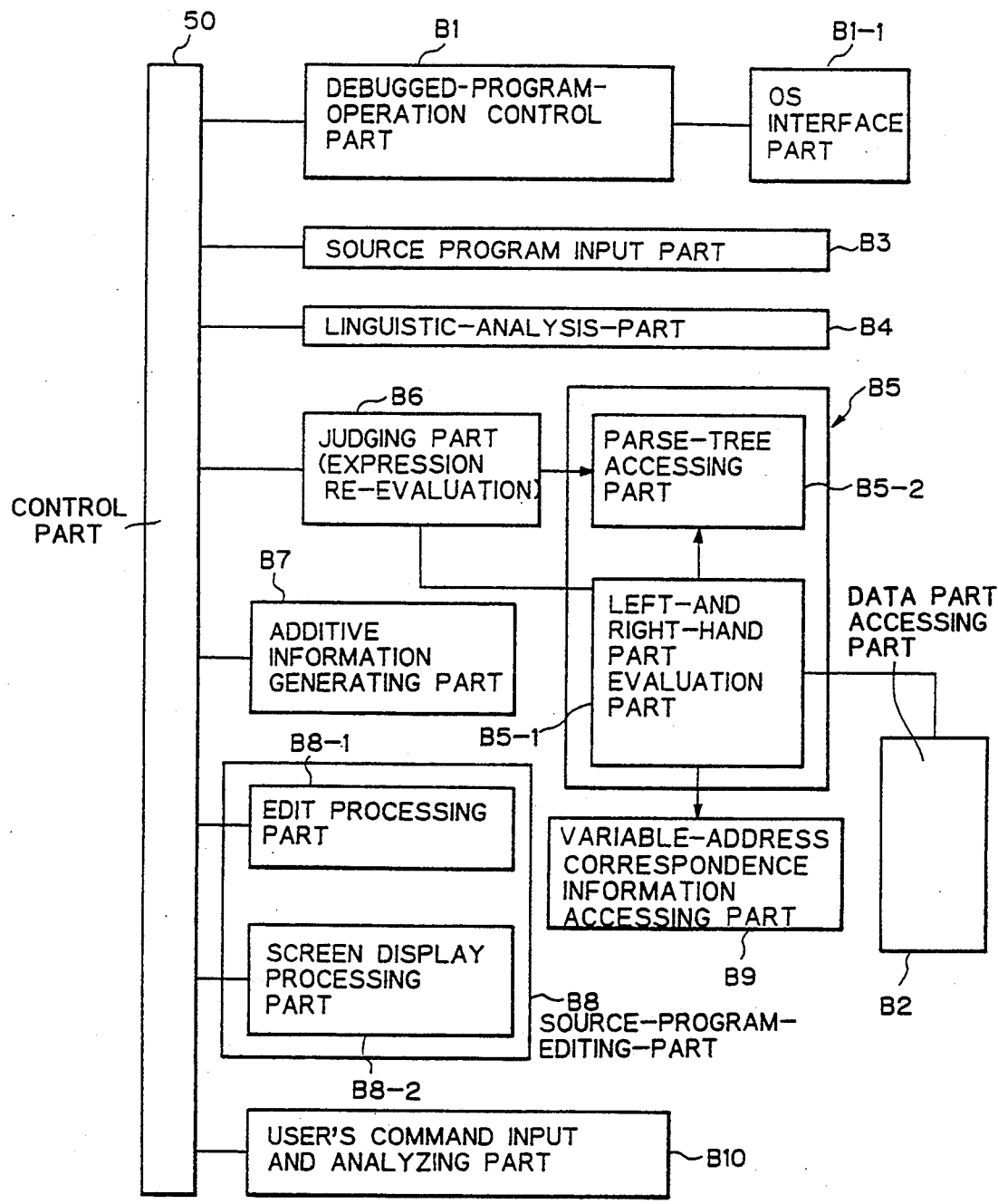
FIG. 3 is an explanatory and functional illustration showing the construction of a module of program B of the present invention.
Figure 4:
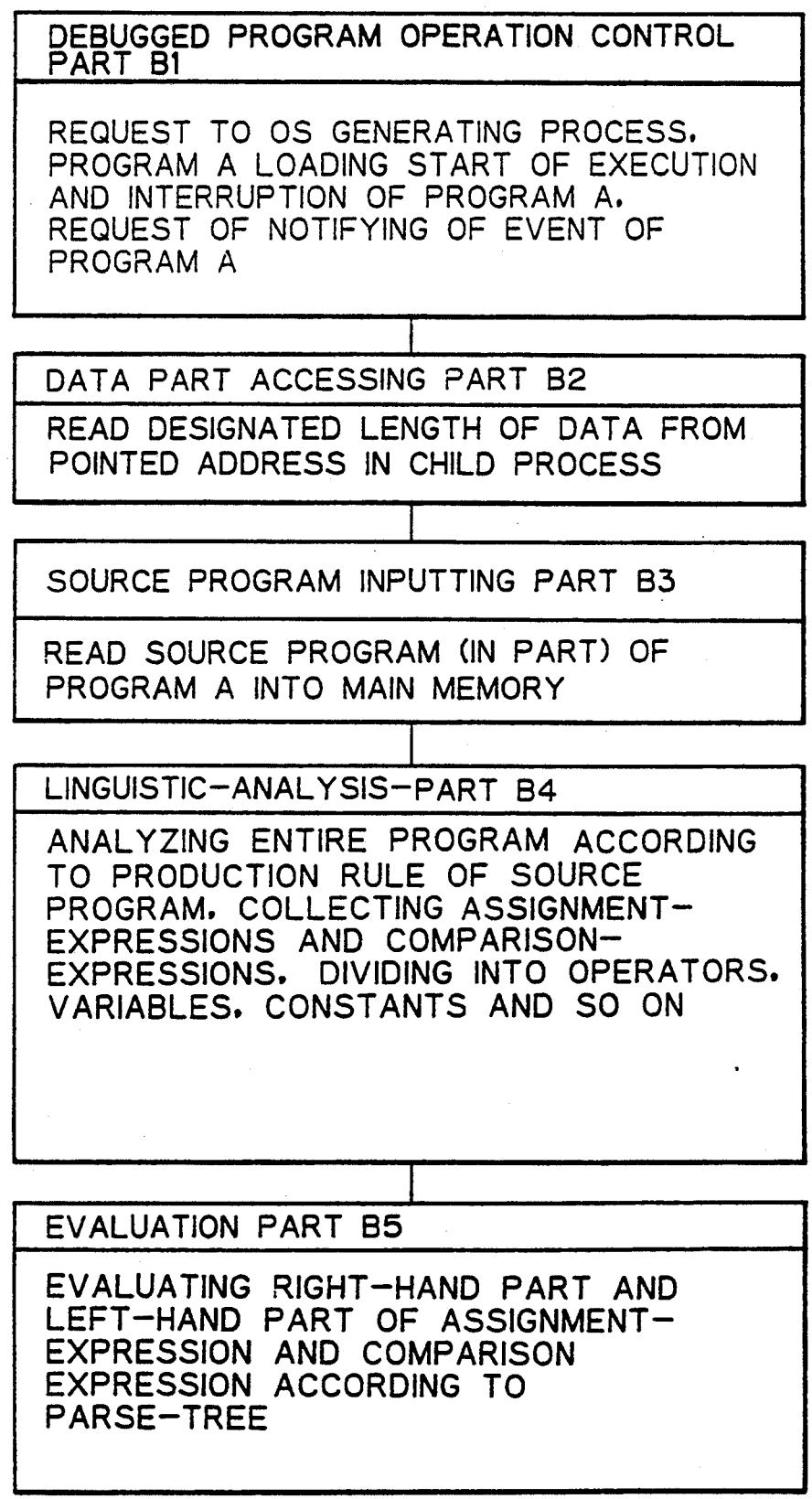

FIG. 3 shows the module construction of the program B that analyzes and displays data of the program A according to the present invention, and FIGS. 4 and 5 shows the detail thereof. Respective components will be discussed herebelow.

The control part 50 controls the total flow of the process of program B.

The debugged-program-operation control part B1 requests the creation of a child process, loading, starting, and interruption to the program A and event notifying request as to the program A, to the OS through the OS interface part B1-1.

The data part accessing part B2 reads out a designated length of data from the designated address in the child process on the main memory 12.

The source program inputting part B3 reads out the source program of the program A into the main memory 12.

The linguistic-analysis-part B4 analyzes source program of the program A according to production rules of the description language of the program A, collects the assignment-expressions and the comparison-expressions dividing the expressions into operators, variables, constants and so forth, and then creates the parse-tree. Also, the linguistic-analysis-part B4 creates the expression-evaluation-list.

The evaluation part B5 evaluates the left-hand parts and the right-hand parts of the assignment-expressions and the comparison-expressions using the parse-tree. In practice, the evaluation part B5 comprises a left- and right-hand parts evaluation part B5-1 and a parse-tree accessing part B5-2.

The judging part B6 compares the values of the right-hand part and the left-hand part to determine whether both the left- and right-hand parts are equal to each other in the case of the assignment-expression and whether a condition of comparison is satisfied in the case of the comparison-expression.

The additive information generating part B7 generates additive information 42 representing the consistent parts of the assignment-expressions and the comparison-expressions in the source program.

The source program editing part B8 edits the consistent parts of the assignment-expressions and the comparison-expressions into distinguished form (such as, underline marking) referring to the additive information and then outputs the entire edited source program.

The variable-address correspondence information accessing part B9 reads out variable-address correspondence information 28 of the program A on the main memory 12. Also, the variable-address correspondence information accessing part B9 derives the address and length in the data part 36 of the program A corresponding to the name of the variable.

The user's command input analyzing part B10 analyzes the command of the user and provides the results of the analysis to the control part 50.

Figure 6:
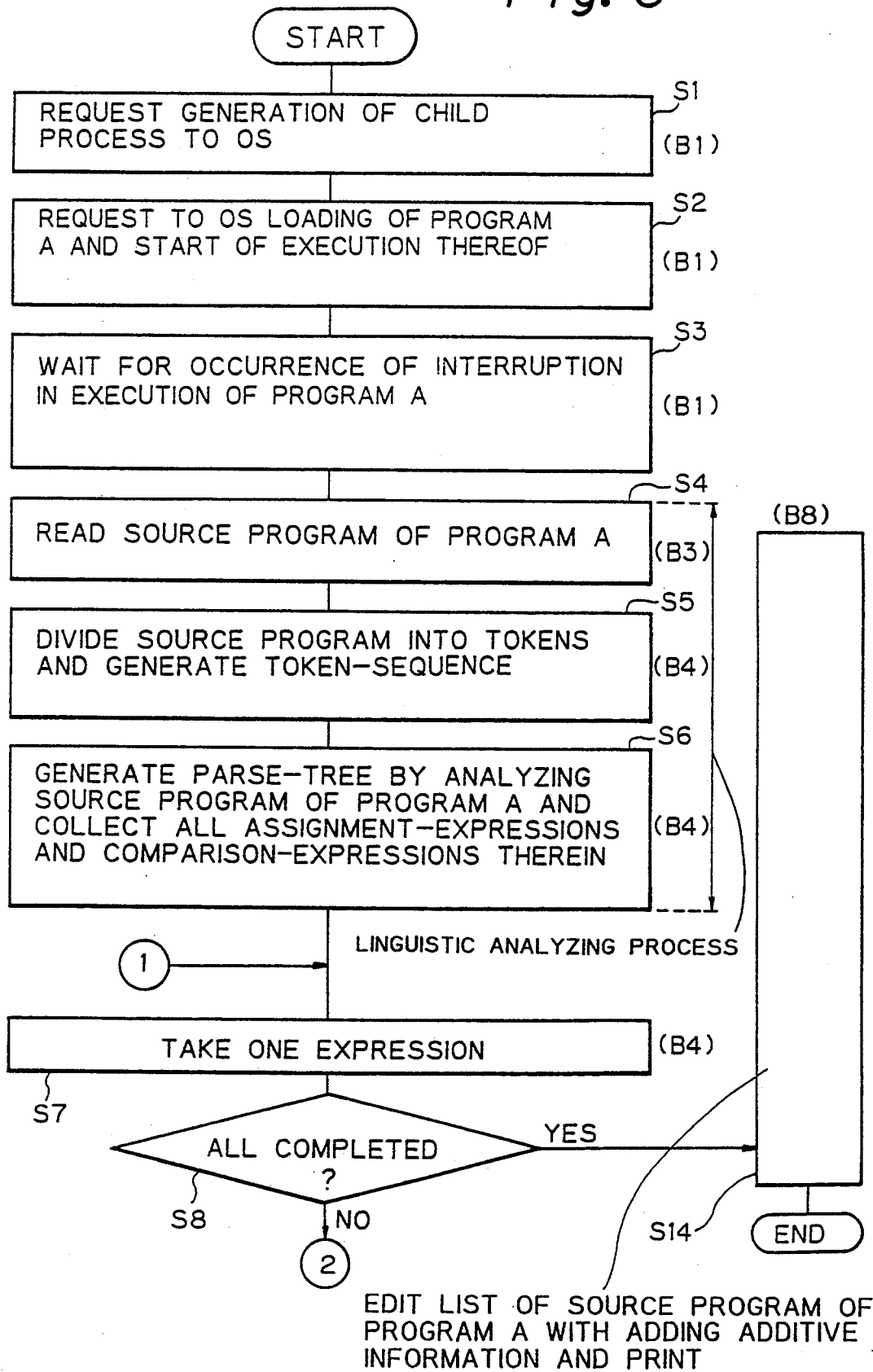
FIGS. 6 and 7 are flowcharts showing series flow of the program B of the present invention.
Figure 7:
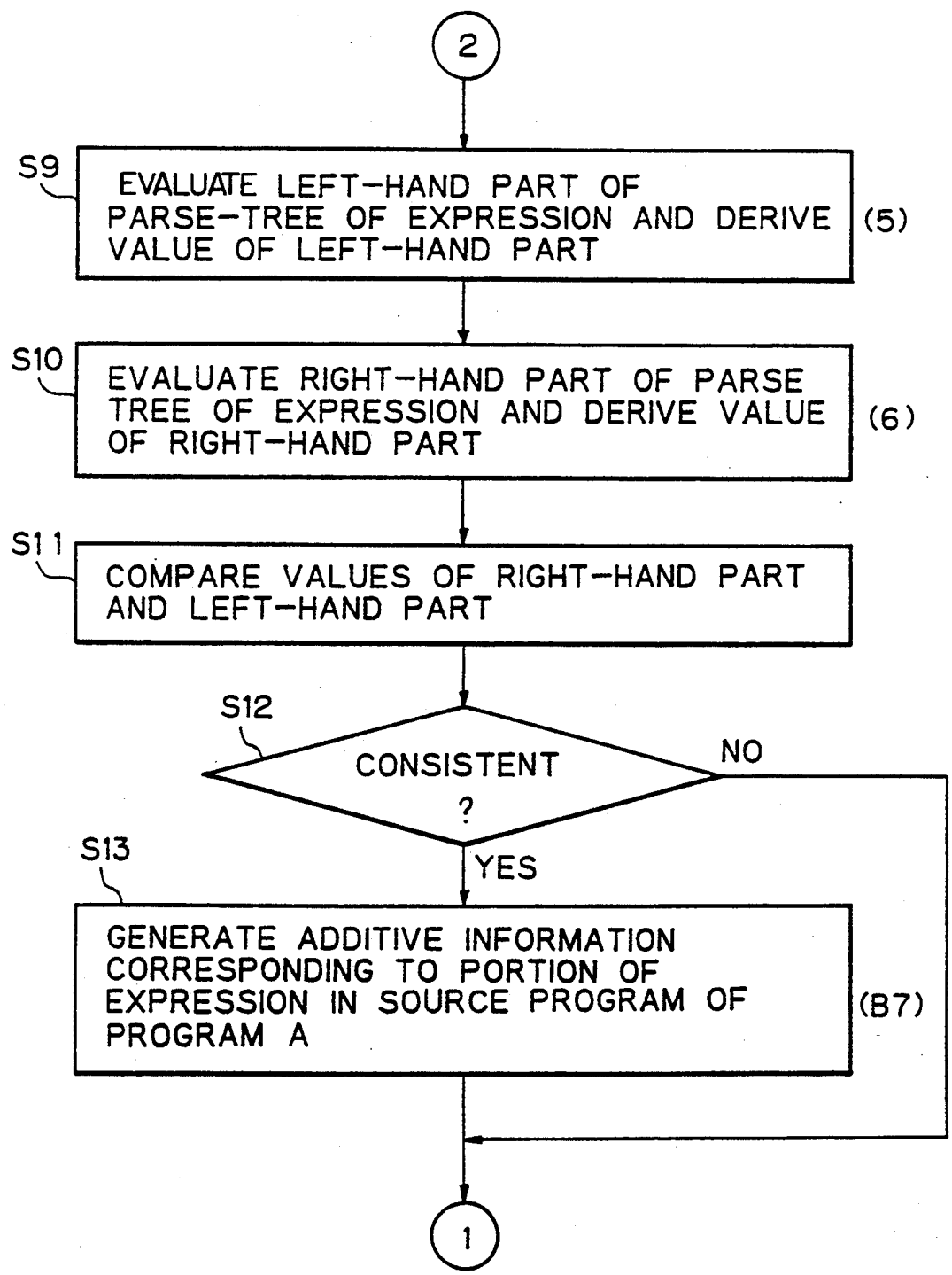

FIGS. 6 and 7 show a series of flowcharts showing processes of analyzing and displaying data of the program according to the present invention.

It should be noted that the signs indicated with the parenthesis at the right lower side of respective steps are an indication of the active modules in the program B in FIGS. 3 and 4 for execution.

In FIG. 6, the program B, at first, requests the OS to create child process, at step S1. Then, at step S2, the program B requests loading the OS to load and start the program A.

At step S3, the program B waits for the occurrence of abnormal interruption of execution of the program A. Once the interruption of execution of the program A occurs at the step S3, the process advances to step S4 to read out the source program of the program A.

Subsequently, at step S5, the source program is divided into tokens and thus a token-sequence is generated.

Next, at step S6, the source program (or divided token-sequence) of the program A is analyzed to create a parse-tree. Also, all of the assignment-expressions and the comparison-expressions in the source program of the program A are collected.

After completion of the foregoing processes, one of the expressions is taken at step S7. Then, the process advances to step S9 via judgement step S8. In the step S9, the left-hand part of the parse tree is evaluated, and the value of the left-hand part is derived. Similarly, at step S10, the right-hand part of the parse-tree of the expression is evaluated and the value of the right-hand part is derived.

Then, at step S11, the values of the right-hand part and the left-hand part are compared. At step S12, judgement is made whether the expression is consistent or not. When the expression is determined consistent, then, at step S13, additive information is generated, which consists of starting and ending character portion of the expression in the source program. Thereafter, the process returns to step S7 in FIG. 6.

The foregoing process is repeated until it is determined that all processes are completed at step S8. Then the process advances to step S14, where the program list of the source program A is output for printing or displaying with editing for additive information, such as providing underlines for the consistent parts of expressions.

FIG. 8 shows a part of the program A that is an object of the process according to the present invention. It should be noted that the shown example of the program A is written by C-language.

In FIG. 8, "if ( )" is a branch operation with a condition. Also, "line>66" indicated in the parenthesis ( ) is a condition-expression that is consistent when the value of the variable "line" is greater than 66.

"if (heads=0)" means that the expression is consistent when the value of the variable "heads" is equal to 0. "heads=1" is an assignment-expression for storing 1 into the variable "heads". Portion "line=printhead1( )" represents calling for a function "printhead1( )" as a sub-routine and storing the value returned from the sub-routine into the variable "line".

FIG. 9 shows example of values of respective variables when the program A stops at a certain point during execution, separately in case 1 and case 2. These values are assumed to be retained in the data part of the program A on the main memory 12.

FIG. 10 shows the results of the output of the source program processed by the present invention with respect to the interrupted states of FIG. 9. In case 1, since the expressions in "line>66" and "heads=1" are consistent, underlines are added for these expressions. On the other hand, in case 2, since only the expression "heads=1" is consistent, the underline is added only for this expression.

The following is a discussion of a practical process of the flowchart in FIGS. 6 and 7 taking the program A in FIGS. 8, 9 and 10 as an example.

At first, FIG. 11 shows an example of the variable-address correspondence information 28 of the program A in external storage unit 14 of FIG. 1, generated by the compiler.

This variable-address correspondence information 28 is known as a symbol table, in which the size of the variable, relative address of variables in the data part and so forth are related to the name of the variables.

For example, when the name of variable "line" is given, it turns out that the variable is an integer type, the size is 4 bites and the relative address in the data part is adr-1.

Figure 12:
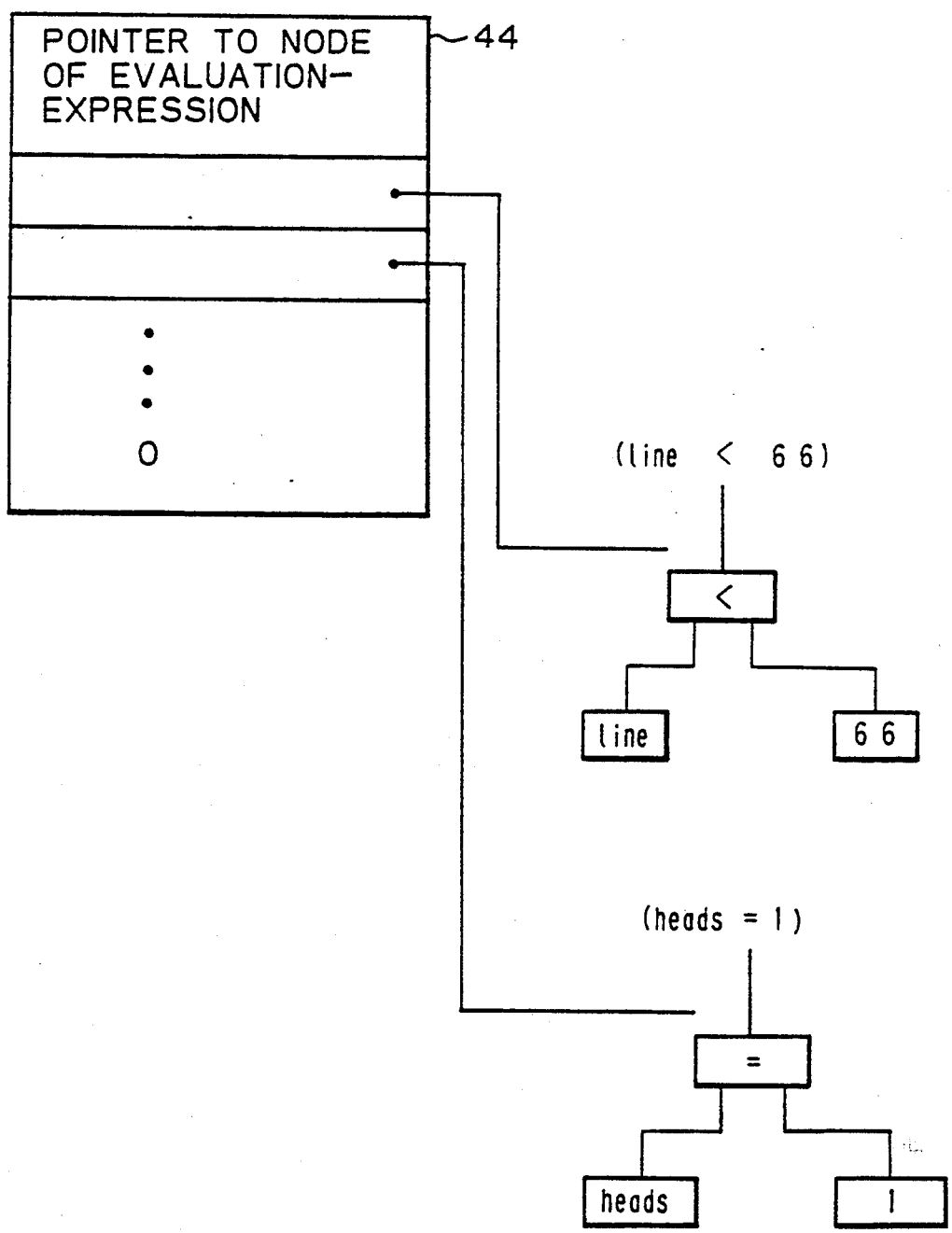
FIG. 12 is an explanatory diagram illustrating a list of evaluating expressions of the present invention.

FIG. 12 shows the expression-evaluation-list 44 generated by the linguistic-analysis-part B4 into the data part 40 after reading out the source program of the program A onto the area for the program A in the main memory from the external storage unit 14. The expression-evaluation-list 44 holds pointers to the nodes in the parse-tree corresponding to each evaluation-expression.

Accordingly, the main routine of the control part 50 designates an element of the expression-evaluation-list sequentially to call the evaluation part B5. The evaluation part B5 designates child nodes corresponding to both hand parts of expression for evaluation. When the expression is consistent, the additive information indicating the consistent part of the source program of the program A is added.

Figures 13, 14:
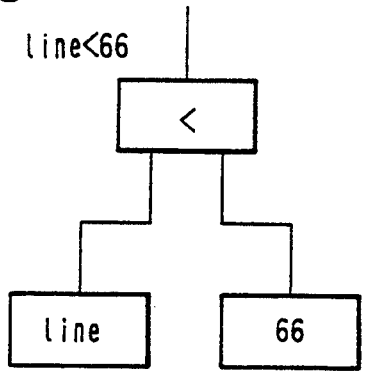
FIG. 13 is an explanatory diagram illustrating a part of a parse-tree corresponding to a comparison-expression.
FIG. 14 is an explanatory chart showing a node of the parse-tree in the present invention.

FIG. 13 is an illustration for a discussion about sub-tree in parse-tree generated by the linguistic-analysis-part B4 in FIG. 4, corresponding to the comparison-expression "line<66".

When the evaluation part B5 of the program B evaluates the left- and right-hand parts of the expression, it uses the parse-tree of FIG. 13.

FIG. 14 shows a format of node information in the parse-tree shown in FIG. 13. The node information includes:

(a) inherited token;
(b) start position of input token-sequence;
(c) length of the token-sequence;
(d) address for storing result of evaluation;
(e) the number of applied grammatical rule;
(f) count of the child nodes; and
(g) area for storing the result of evaluation for each child node.

Here, the token id means an idenification number of the token of a sign, for example, ( , ) reserved word, for example, "if", the number indications that it is a variable or an identification number of left-hand token in the gramatical rule applied to the node.

Figures 15, 15A:
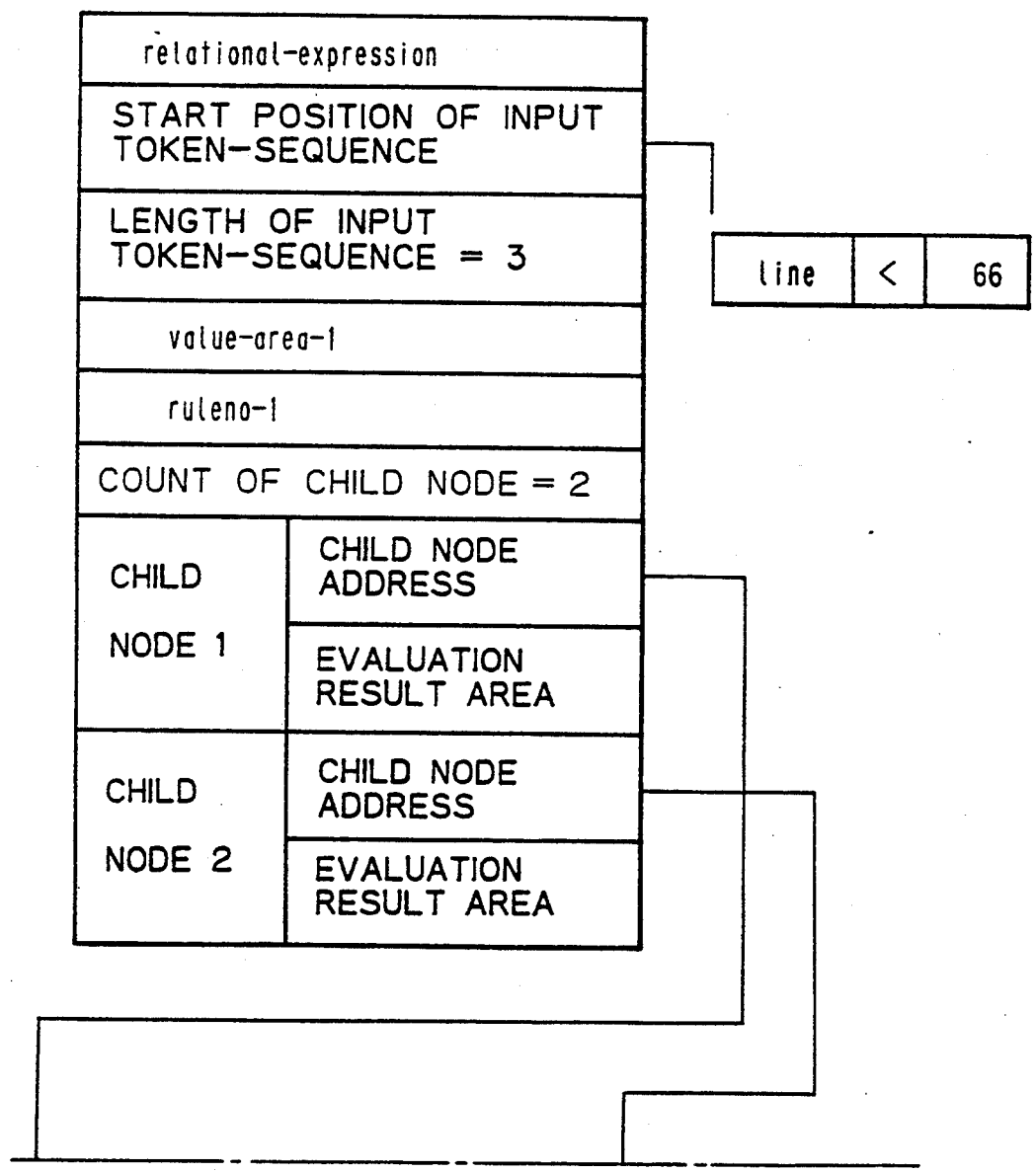
FIGS. 15A and 15B form, connected as shown in FIG. 15, an explanatory diagarm illustrating FIG. 15, an explanatory diagram illustrating parse-tree information at a portion of line<66 of FIG. 13.

The left-hand token means the token in the left-hand part of the grammatical rule. The input token-sequence means a part of the token-sequence inherited to the node during creation of the parse-tree. The parse-tree is grown downward by dividing inherited token-sequence and extending the branches downward, FIGS. 15A and 15B, connected as shown in FIG. 15, are a detailed illustration of the parse-tree of FIG. 13.

Then, the evaluation part B5 of the program B in FIG. 3 is provided with the information of the parse-tree of FIGS. 15A and 15B and again evaluates upward using the values stored by a lower node or value of variables stored in the data part 30 of the program A on the main memory.

The result of evaluation is conversely written to upper nodes by storing into the address indicated by (d) above in the node information.

The applied grammatical rule in the node indicates the grammatical rule applied with respect to the input token-sequence. The applied grammatical rule in the node also indicates the processing method for operation and comparison.

Figure 15B:
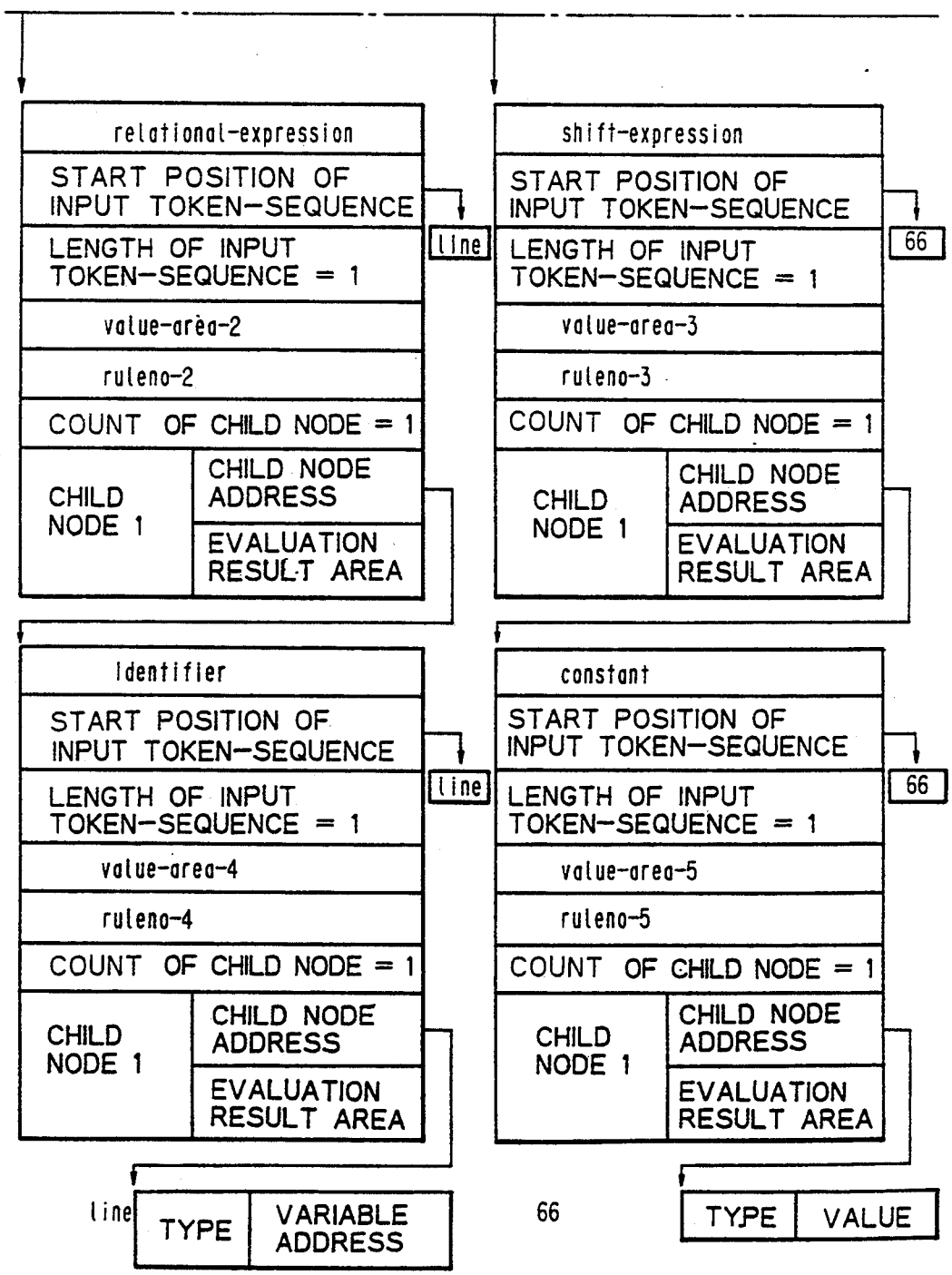
Figures 16, 17:
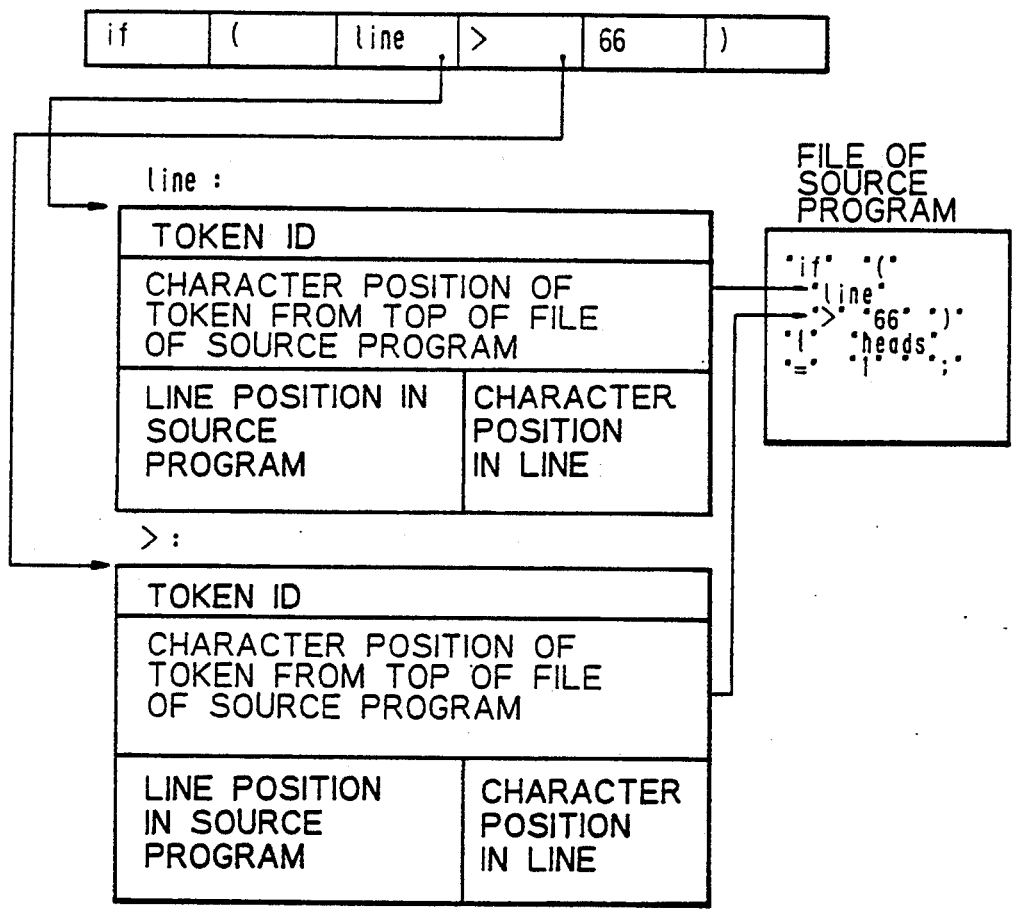
FIG. 16 is an explanatory diagram showing a sequence of discrete tokens in the program A.
FIG. 17 is an illustration showing a production rule of the description language of the program A.

FIG. 16 is an explanatory illustration of the token-sequence obtained by dividing the source program into tokens, in advance of the generation of the parse-tree of FIGS. 15A and 15B. The token-sequence stores (a) token id;
(b) position of the start character from top of the file in the source program;
(c) line number: and
(d) start character position in the line.

The input token-sequence pointed out by the node on the parse-tree shown in FIGS. 15A and 15B represents a partial token-sequence in the token-sequence if the program A.

FIG. 17 shows the grammatical rule in the C-language applied for the upper three nodes in the parse-tree shown in FIGS. 15A and 15B.

In the process for generating the parse-tree, the grammatical rule, as a left-hand token, and having the right-hand applicable to the input token-sequence for some divisions of input token, is selected and applied.

Then, the input token-sequence corresponding to respective tokens in the right-hand parts are repeatedly given to its child nodes. The input token-sequence is finally divided into an individual token. Thus, the parse-tree is generated for the input token-sequence and the grammatical rules. This process is known as a recursive descent parsing method or recursive descent parser.

Figure 18:
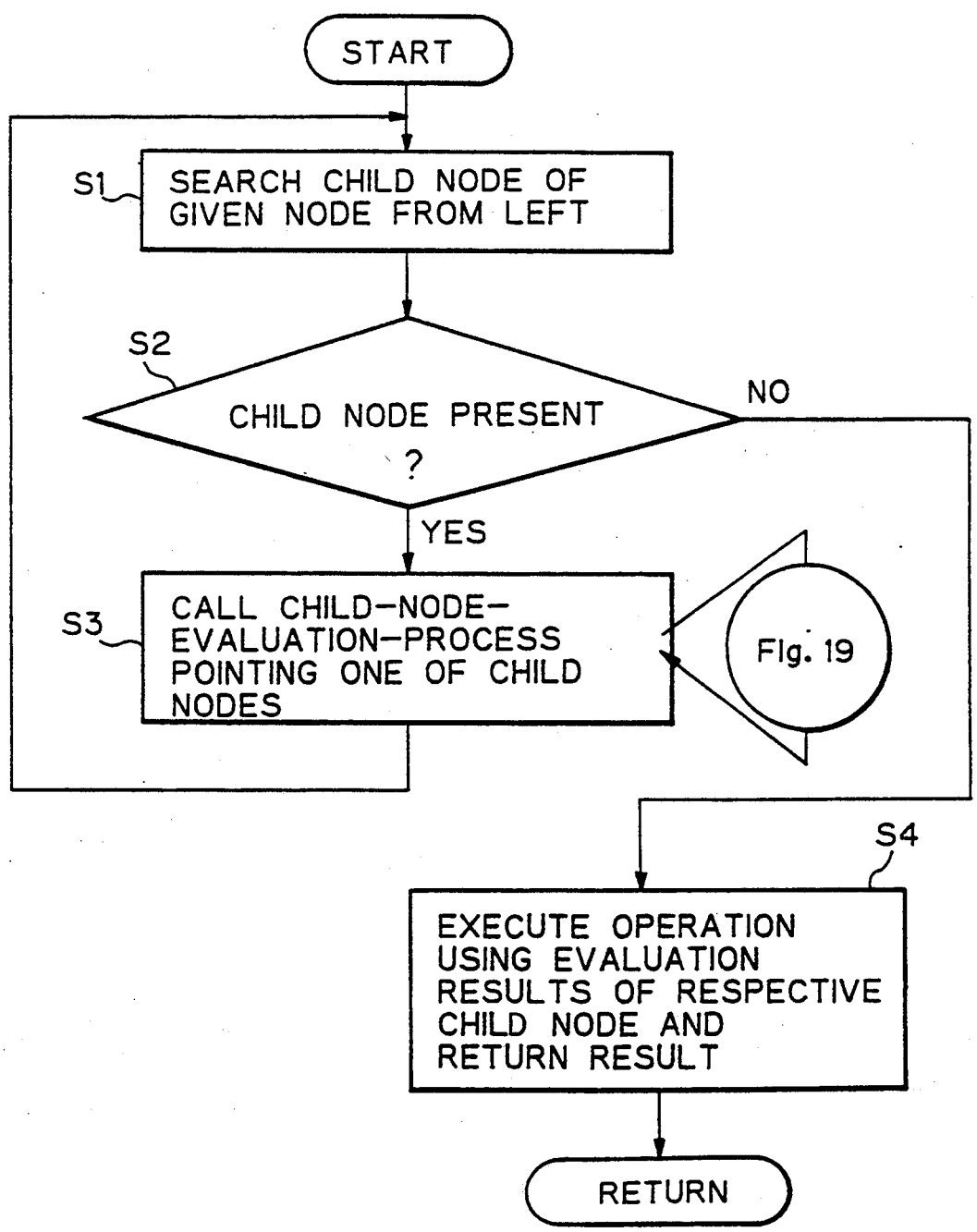
FIG. 18 is a flowchart showing an operation evaluation process executed by left and right-hand parts evaluating means B5-1 in the present invention.

FIG. 18 is a flowchart showing an operation evaluation process executed in the process of the left- and right-hand part evaluation part B5-1 of the program B of FIG. 3. This operation evaluation process is a process to execute an operation in the expression using the value of the child node in the node corresponding to the operation.

In FIG. 18, at first, at a step S1, the child node of the given node is searched from the left. At step S2, if the request of judgement is that the child node is present, the process advances to step S3 to call the child-node-evaluation-process specifying one of its child nodes to obtain the value of the node.

On the other hand, when no child node is found, the process is advanced to step S4 to execute an operation in the expression determined by the applied rule number using the already obtained results of child-node-evaluation and returns the result.

Figure 19:
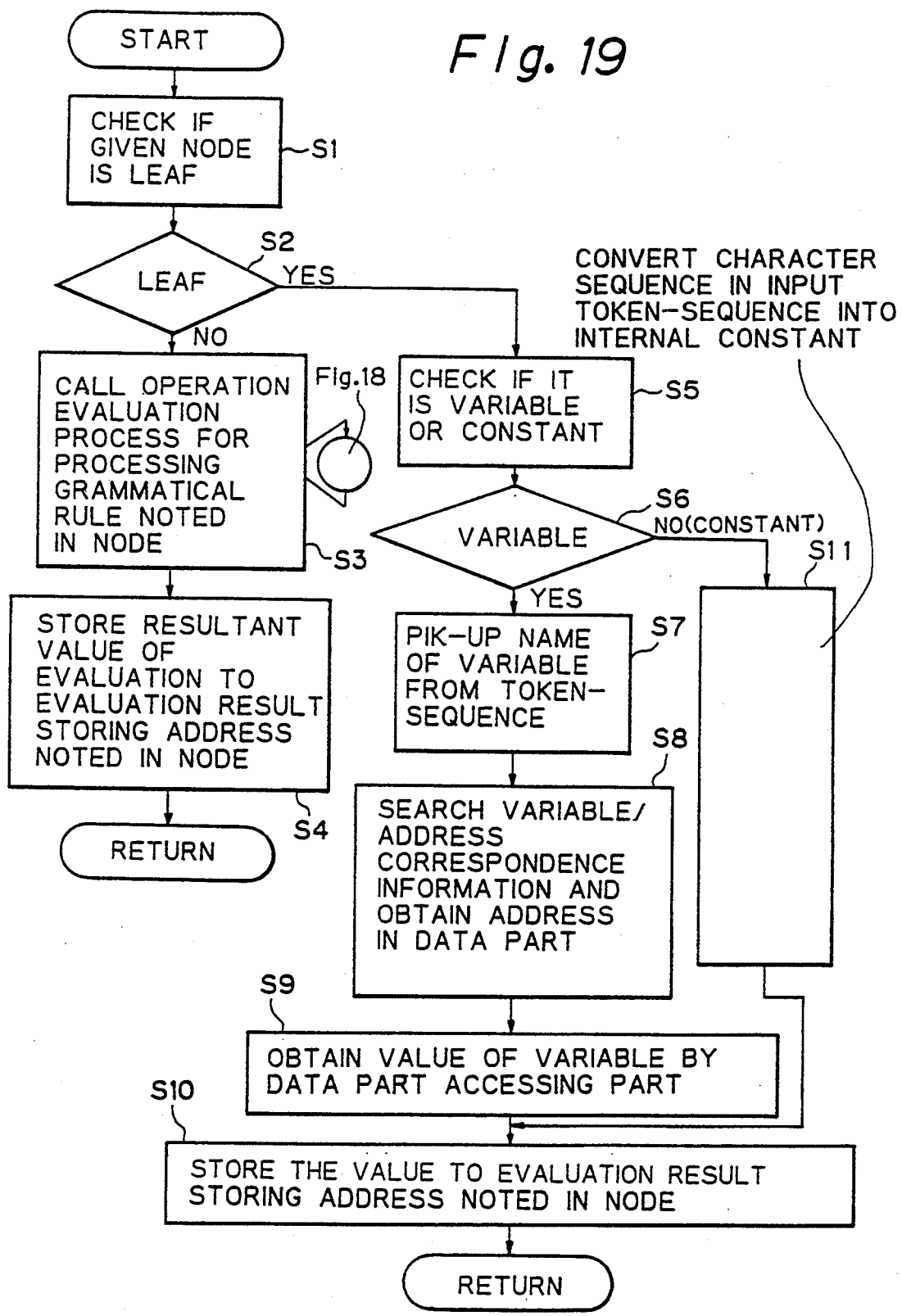
FIG. 19 is a flowchart showing an evaluation process for a child node of the left- and right-hand parts executed by evaluating means B5-1 in the present invention.

FIG. 19 is a flowchart showing the child-node-evaluation-process executed by the left- and right-parts evaluation part B5-1 of the program B which is called by the step S3 of FIG. 18.

In FIG. 19, at first, at step S1, it is checked if the given node is a leaf (end) of the parse-tree. If the given node is not the leaf, the process advances to step S3 via step S2 to call the operation evaluation process of FIG. 18 for processing the grammatical rule noted in the node.

Then, the process advances to step S4 to store the result of evaluation into the address noted in the node.

On the other hand, if the given node is the leaf, the process advances from step S2 to step S5, in which it is checked if the node is a variable or a constant. In the case of a variable, the process advances to step S7 via step S6 to pick-up the name of the variable and search for the picked-up variable name in the variable-address correspondence information 28 shown in FIG. 13, at step S8 to obtain an address in the data area (data part 36) by adding the start address of the data part 36 in the memory.

Next, at step S9, by the data part accessing means, namely, the data part accessing part B2, the value of the variable is stored in the area of the program A in the main memory. Subsequently, at step S10, the value of the variable obtained from the main memory 12 is stored into the address for storing the result of evaluation, noted in the node.

On the other hand, in the case of the constant, the process is advanced from the step S6 to step S11 to convert the character sequence in the source program corresponding to the token-sequence into the internal constant, for example, binary data.

When the evaluation part B5 evaluates the left-hand part and the right-hand part, evaluation is performed by calling the child-node-evaluation-process specifying one of the nodes in the parse-tree.

FIG. 20 is an illustration showing the additive information representing the consistent expression in the source program finally obtained through the process of the program B, in the case of "case 1" of FIG. 10.

The additive information indicates that the consistent expression "line>66" is written from the 110th line, 4th digit to the 110th line, and 10th digit. Also, the consistent expression "heads=1" is written from the 114th line, 4th digit to the 114th line, and 15th digit.

It should be noted that although the foregoing embodiment reads out the value of the variables of the program (program A) to be debugged directly from the main memory, it is possible to read those values from the memory dump information.

Furthermore, in the foregoing embodiment, the source program added thereto the additive information is output onto the displace screen, it is, of course, possible to output to the printer.

With respect to the grammar of the C-language illustrated in the foregoing embodiment, reference is made to "PROGRAMMING LANGUAGE C, 2ND EDITION" written by B. W. Kernighan, and D. M. Ritchie, (translated by Haruhisa ISHIDA, Jun. 15, 1989, Kyoritsu Shuppan K.K.). Also, for the parse-tree, reference is made to Ikuo NAKATA, "COMPILER" (Sep. 10, 1981, Sangyo Tosho K.K.)

As set forth above, according to the present invention, since the consistent expressions in the source program are output with the underlines, on the basis of the values of the variables of the program data part that is abnormally terminated, effective information for assuming the running path of the program can be obtained even when no trace information is available and thus allows effective trouble shooting for the cause of error in the program.

What is claimed is:

1. A computer implemented system for analyzing program data and having a main memory, comprising:
   a linguistic-analysis part stored in the main memory for inputting a source program of a program, analyzing the source program based on a language of the source program, collecting assignment-expressions and comparison-expressions in the source program, and collecting names of variables in the assignment-expressions and comparison-expressions;
   a correspondence information accessing part, stored in the main memory and coupled to a load module of the program, for accessing variable-address correspondence information representing correspondence between a name of a variable and a variable address in the load module;
   a data part accessing part, stored in the main memory and coupled to said correspondence information accessing part, for accessing the variables of a data part of the load module of the program in an interrupted state or a termination state;
   an evaluation part, stored in the main memory and coupled to said linguistic-analysis part and said data part accessing part, for obtaining the variable addresses for variables contained in respective assignment-expressions and comparison-expressions in the source program collected by said linguistic-analysis part, deriving values of the variables in the program by using said data part accessing part, and evaluating respective left-hand parts and right-hand parts of the expressions;
   a judging part, stored in the main memory, and coupled to said evaluation part, for determining for each of the expressions, that the expression is consistent when the left-hand part and the right-hand part are equal to each other in the case of the assignment-expression, and when values of the left-hand part and the right-hand part satisfy a comparison condition in the case of the comparison-expression; and
   a source-program-editing part, stored in the main memory and coupled to said judging part, for outputting the source program where the expressions that are determined to be consistent by said judging part, are edited into distinguished form compared to other parts of the expressions of the source program.

2. A computer implemented system for analyzing program data as claimed in claim 1, wherein said linguistic-analysis part inputs the source program, generates a parse-tree based on a production rule of the language and generates an expression-evaluation-list including a pointer to a node of the parse-tree, and wherein said evaluation part performs an evaluation of a sub-parse-tree below the node pointed by the expression-evaluation-list.

3. A computer implemented system for analyzing program data as claimed in claim 1, wherein the main memory has a memory area, wherein the contents of said data part to be used for evaluation during the interrupted state of running the program or at the termination of the program, are taken from said memory area on said main memory to which the program is loaded from an external storage unit and executed therein.

4. A computer implemented system for analyzing program data as claimed in claim 3, wherein the contents of said data part in the interrupted state of running the program or at the termination of the program is the contents output from said main memory to said external storage unit.

5. A computer implemented system for analyzing program data as claimed in claim 1, further comprising a keyboard-display terminal including a display screen, wherein said source-program-editing part outputs the edited source program to a file area of an external storage unit after evaluation of the assignment-expression and the comparison-expression, and subsequently outputs a range of lines of the source program designated by the user of said keyboard-display terminal on said display screen.

6. A computer implemented system for analyzing program data as claimed in claim 5, wherein said source-program-editing part also outputs lines determined from a line number designated by the user and information identifying the line numbers including the consistent expressions.

7. A computer implemented method for analyzing program data comprising the steps of:
   analyzing a source program corresponding to a program in one of an interruption state and a termination state, and collecting an assignment-expression and a comparison-expression in the source program;
   obtaining variable names and variable addresses for variables contained in the assignment-expression and the comparison-expression;

deriving a value of the variable of a data part in the program;
determining whether left-hand parts and right-hand parts of the assignment-expression and the comparison-expression are consistent; and
outputting the source program where the left-hand and right-hand parts of the expressions are determined to be consistent, in edited and distinguished form compared to other parts of the source program.

* * * * *

UNITED STATES PATENT AND TRADEMARK OFFICE
CERTIFICATE OF CORRECTION

PATENT NO. : 5,408,660
DATED : APRIL 18, 1995
INVENTOR(S) : Yohtaro KITADATE

It is certified that error appears in the above-indentified patent and that said Letters Patent is hereby corrected as shown below:

Col. 3,      line 51, "form," should be deleted;
line 52, "FIG. 15, an" should be --FIG. 15, form an--; and
line 52, "FIG. 15," (second occurrence) should be deleted;
line 53, "an explanatory diagram illustrating" should be deleted.

Col. 4,      line 31, "Judging" should be --judging--.

Col. 5,      line 44, "such an" should be --such as an--.

Col. 7,      line 52, "loading" should be deleted.

Col. 9,      line 33, "indications" should be --indicating--.

Signed and Sealed this

Twentieth Day of June, 1995

Attest:

BRUCE LEHMAN

Attesting Officer      Commissioner of Patents and Trademarks